United States Patent
Rosman et al.

(10) Patent No.: US 12,240,471 B2
(45) Date of Patent: Mar. 4, 2025

(54) SYSTEMS AND METHODS FOR OPTIMIZING COORDINATION AND COMMUNICATION RESOURCES BETWEEN VEHICLES USING MODELS

(71) Applicant: Toyota Research Institute, Inc., Los Altos, CA (US)

(72) Inventors: Guy Rosman, Newton, MA (US); Stephen G. McGill, Jr., Cambridge, MA (US); Paul Drews, Watertown, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 334 days.

(21) Appl. No.: 17/882,973

(22) Filed: Aug. 8, 2022

(65) Prior Publication Data
US 2024/0043020 A1    Feb. 8, 2024

(51) Int. Cl.
*B60W 50/00*    (2006.01)
*B60W 50/06*    (2006.01)
(Continued)

(52) U.S. Cl.
CPC ........ *B60W 50/0097* (2013.01); *B60W 50/06* (2013.01); *G05B 13/0265* (2013.01);
(Continued)

(58) Field of Classification Search
None
See application file for complete search history.

(56) References Cited

U.S. PATENT DOCUMENTS

| | | |
|---|---|---|
| 11,295,180 B1 | 4/2022 | Tolstov et al. |
| 11,685,403 B2 * | 6/2023 | Manivasagam ........ G06N 3/045 370/329 |

(Continued)

FOREIGN PATENT DOCUMENTS

WO    2022079834 A1    4/2022

OTHER PUBLICATIONS

Huang et al., "HYPER: Learned Hybrid Trajectory Prediction via Factored Inference and Adaptive Sampling," arXiv:2110.02344v1 [cs.RO], Oct. 5, 2021, pp. 1-12.

(Continued)

*Primary Examiner* — James J Lee
*Assistant Examiner* — Jonathan E Reinert
(74) *Attorney, Agent, or Firm* — Christopher G. Darrow; Darrow Mustafa PC

(57) ABSTRACT

System, methods, and other embodiments described herein relate to coordinating and optimizing prediction by a model using intermediate data and vehicle-to-vehicle (V2V) communications that improves bandwidth utilization. In one embodiment, a method includes processing acquired data, by a subject vehicle using a prediction model, to execute a vehicle task associated with navigating a driving scene. The method also includes extracting processed data according to the acquired data from intermediate activations of layers within the prediction model according to a cooperation model. The method also includes quantifying relevancy of the processed data, for a target vehicle, to select a subset using the cooperation model. The method also includes communicating the subset to a selected vehicle having the prediction model for additional prediction according to the relevancy and available resources to transmit the subset.

20 Claims, 5 Drawing Sheets

(51) Int. Cl.
   *B60W 60/00*  (2020.01)
   *G05B 13/02*  (2006.01)

(52) U.S. Cl.
   CPC ............ *B60W 2050/0022* (2013.01); *B60W 2050/0028* (2013.01); *B60W 60/0027* (2020.02); *B60W 2420/403* (2013.01); *B60W 2556/10* (2020.02); *B60W 2556/65* (2020.02)

(56) References Cited

U.S. PATENT DOCUMENTS

| | | | |
|---|---|---|---|
| 2020/0312155 A1* | 10/2020 | Kelkar | ............... B60W 60/005 |
| 2020/0394522 A1 | 12/2020 | Liu et al. | |
| 2022/0067482 A1 | 3/2022 | Bariamis | |
| 2022/0067525 A1 | 3/2022 | Sequeira et al. | |
| 2022/0114455 A1 | 4/2022 | Samek et al. | |
| 2023/0322256 A1* | 10/2023 | Haefner | ................. H04W 4/46 701/23 |

OTHER PUBLICATIONS

Huang et al., "Uncertainty-Aware Driver Trajectory Prediction at Urban Intersections," 2019 International Conference on Robotics and Automation (ICRA), 2019, pp. 9718-9724.

Zhang et al., "Deep Reinforcement Learning Based Mode Selection and Resource Allocation for Cellular V2X Communications," in IEEE Internet of Things Journal, vol. 7, No. 7, Jul. 2020, pp. 6380-6391.

Yu et al., "SPFCN: Select and Prune the Fully Convolutional Networks for Real-time Parking Slot Detection," 2020 IEEE Intelligent Vehicles Symposium (IV), 2020, pp. 445-450.

Wang et al., "V2VNet: Vehicle-to-Vehicle Communication for Joint Perception and Prediction," ECCV 2020, Lecture Notes in Computer Science, vol. 12347, Aug. 17, 2020, pp. 605-621.

* cited by examiner

SYSTEMS AND METHODS FOR OPTIMIZING COORDINATION AND COMMUNICATION RESOURCES BETWEEN VEHICLES USING MODELS

TECHNICAL FIELD

The subject matter described herein relates, in general, to optimizing coordination between vehicles, and, more particularly, to coordinating and optimizing prediction by a model using intermediate data and vehicle-to-vehicle communications.

BACKGROUND

Vehicles can form networks for sharing information. For example, vehicles can form an ad-hoc vehicle-to-vehicle (V2V) network for executing various tasks. Through information sharing, vehicles can coordinate as a task to manage traffic and improve safety. Here, such coordination can involve adapting motion plans using a V2V network. Furthermore, vehicles communicate for particular safety applications. For instance, a vehicle notifies other vehicles of an atypical hazard (e.g., large animal) on the road using V2V. This improves safety for both networked vehicles and legacy vehicles that benefit from observing reactions to the atypical hazard.

Coordination using V2V involves managing limited bandwidth and various vehicle capabilities. Data involving prediction models can consume available bandwidth, especially when involving driving scenarios that are complex. As such, a vehicle may forego communicating relevant estimates from a prediction model due to bandwidth constraints. Accordingly, the bandwidth constraints can hinder the performance and safety of other vehicles since prediction models use lesser quality data for observations.

SUMMARY

In one embodiment, example systems and methods relate to coordinating and optimizing prediction by a model using intermediate data and vehicle-to-vehicle (V2V) communications that improves bandwidth utilization. In various implementations, systems coordinating prediction and planning using V2V encounter difficulties from bandwidth constraints. For example, a prediction model in a vehicle generates substantial data for a driving scenario that is complex. The vehicle may be unable to communicate the data due to size of the available V2V resources. Similarly, a vehicle foregoes communication because the transmission time is greater than an event period for the driving scenario, thereby causing the data to go stale. Therefore, in one embodiment, a coordination system extracts data from intermediate activations (e.g., an active neural node) within a prediction model using a cooperation model. The extracted data facilitates overcoming the bandwidth constraints by having an efficient size relative to data types. Here, the data may be image data, controller area network (CAN) data, past trajectories, velocity, and so on, partially processed by the prediction model at various layers. The coordination system selects the extracted data through the cooperation model that quantifies the relevancy about a target vehicle relative to a selected vehicle. Bandwidth constraints are also factored when selecting the extracted data from intermediate activations. In this way, the coordination system saves bandwidth while communicating relevant data that simplifies predictions for nearby vehicles by avoiding the initial processing of the sensor data to generate the intermediate information. As such, the coordination system communicates the processed data to a selected vehicle having the prediction model for additional prediction and other tasks. Thus, the coordination system efficiently manages a trade-off between bandwidth and task performance by tailoring and communicating intermediate data that reduces processing by the prediction model.

In one embodiment, a coordination system for coordinating and optimizing prediction by a model using intermediate data and V2V communications that improves bandwidth data utilization is disclosed. The coordination system includes a processor and a memory communicably coupled to the processor storing instructions that, when executed by the processor, cause the processor to process acquired data, by a subject vehicle using a prediction model, to execute a vehicle task associated with navigation of a driving scene. The instructions also include instructions to extract processed data according to the acquired data from intermediate activations of layers within the prediction model according to a cooperation model. The instructions also include instructions to quantify relevancy of the processed data, for a target vehicle, to select a subset using the cooperation model. The instructions also include instructions to communicate the subset to a selected vehicle having the prediction model for additional prediction according to the relevancy and available resources to transmit the subset.

In one embodiment, a non-transitory computer-readable medium for coordinating and optimizing prediction by a model using intermediate data and V2V communications that improves bandwidth utilization and including instructions that when executed by a processor cause the processor to perform one or more functions is disclosed. The instructions include instructions to process acquired data, by a subject vehicle using a prediction model, to execute a vehicle task associated with navigating a driving scene. The instructions also include instructions to extract processed data according to the acquired data from intermediate activations of layers within the prediction model according to a cooperation model. The instructions also include instructions to quantify relevancy of the processed data, for a target vehicle, to select a subset using the cooperation model. The instructions also include instructions to communicate the subset to a selected vehicle having the prediction model for additional prediction according to the relevancy and available resources to transmit the subset.

In one embodiment, a method for coordinating and optimizing prediction by a model using intermediate data and V2V communications that improves bandwidth utilization is disclosed. In one embodiment, the method includes processing acquired data, by a subject vehicle using a prediction model, to execute a vehicle task associated with navigating a driving scene. The method also includes extracting processed data according to the acquired data from intermediate activations of layers within the prediction model according to a cooperation model. The method also includes quantifying relevancy of the processed data, for a target vehicle, to select a subset using the cooperation model. The method also includes communicating the subset to a selected vehicle having the prediction model for additional prediction according to the relevancy and available resources to transmit the subset.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
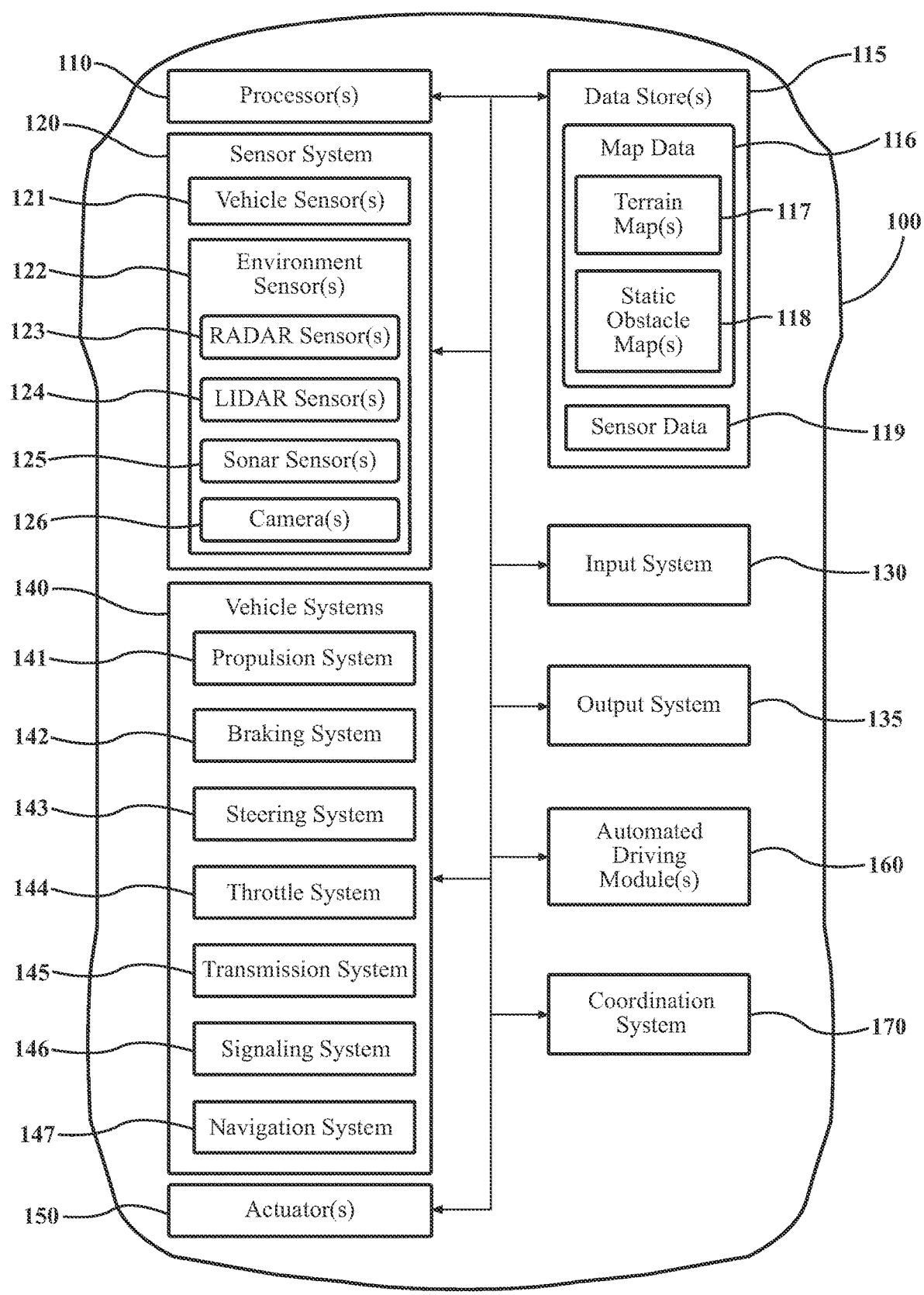
FIG. 1 illustrates one embodiment of a vehicle within which systems and methods disclosed herein may be implemented.

Systems, methods, and other embodiments associated with coordinating and optimizing prediction models using intermediate data and vehicle-to-vehicle (V2V) communications that improves bandwidth utilization are disclosed herein. In various implementations, systems coordinating the execution of vehicle tasks using V2V encounter difficulties from bandwidth constraints. For example, a prediction model generates substantial data for a driving scenario at a complex intersection or lane merge. As such, vehicles may be unable to communicate the prediction data using V2V due to size, connectivity resources, and so on. Prediction data also goes stale when the transmission time is greater than an event period involving a driving scenario, such as a complex maneuver. Therefore, in one embodiment, a coordination system includes a prediction model that extracts processed data for cooperative inferences that are optimized through a cooperation model. Here, the processed data may be outputs of intermediate activations for layers (e.g., neural nodes) within the prediction model. An intermediate activation may represent image data, past trajectories, angular velocity, and so on, partially processed by the prediction model within an internal layer. In comparison, the prediction model generates complete data by estimating probabilities for position, trajectories, and so on involving the target vehicle.

Moreover, the coordination system quantifies relevancy for a target vehicle to select a subset of the processed data. For example, the cooperation model factors available bandwidth for communicating a trajectory where relevancy is quantified on a statistical distribution (e.g., a normal distribution). In one approach, the processed data is relevant when a vehicle has an observation that another vehicle can utilize for executing difficult tasks. Here, nearby vehicles use the subset for training the prediction model. Vehicles may also reduce processing by performing additional predictions about the target vehicle using the intermediate data.

Furthermore, the coordination system communicates processed data from the intermediate activations by the cooperation model. Here, the cooperation model may factor relevancy of expected observations and views about a target vehicle. For example, the angular velocity of the target vehicle is more relevant at an intersection than in a vehicle following scenario. Thus, the coordination system prioritizes communicating proceed data associated with the angular velocity for intersection scenarios. Regarding additional bandwidth management, the coordination system compactly communicates cluster weights from the prediction model and internal representations for model training or implementation. This may involve selectively communicating information according to relevancy, which can include the coordination system using a Gaussian model for trajectories estimated of the target vehicle to determine relevance. In one approach, the relevancy is quantified by analyzing a statistical distribution of polynomial trajectories about the target vehicle to identify trajectories having the greatest impact on the target vehicle and thereby improving the selection of the processed data and reducing bandwidth usage. Accordingly, the coordination system improves bandwidth management by selecting and communicating intermediate data from the prediction model for additional predictions involving a driving scenario.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, a coordination system 170 uses road-side units (RSU), consumer electronics (CE), mobile devices, robots, drones, and so on that benefit from coordinating and optimizing prediction models using intermediate data and V2V communications that improve observations and bandwidth usage.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes the coordination system 170 that is implemented to perform methods and other functions as disclosed herein relating to the coordination and optimization of prediction models using intermediate data and V2V communications that improves bandwidth utilization.

Figure 2:
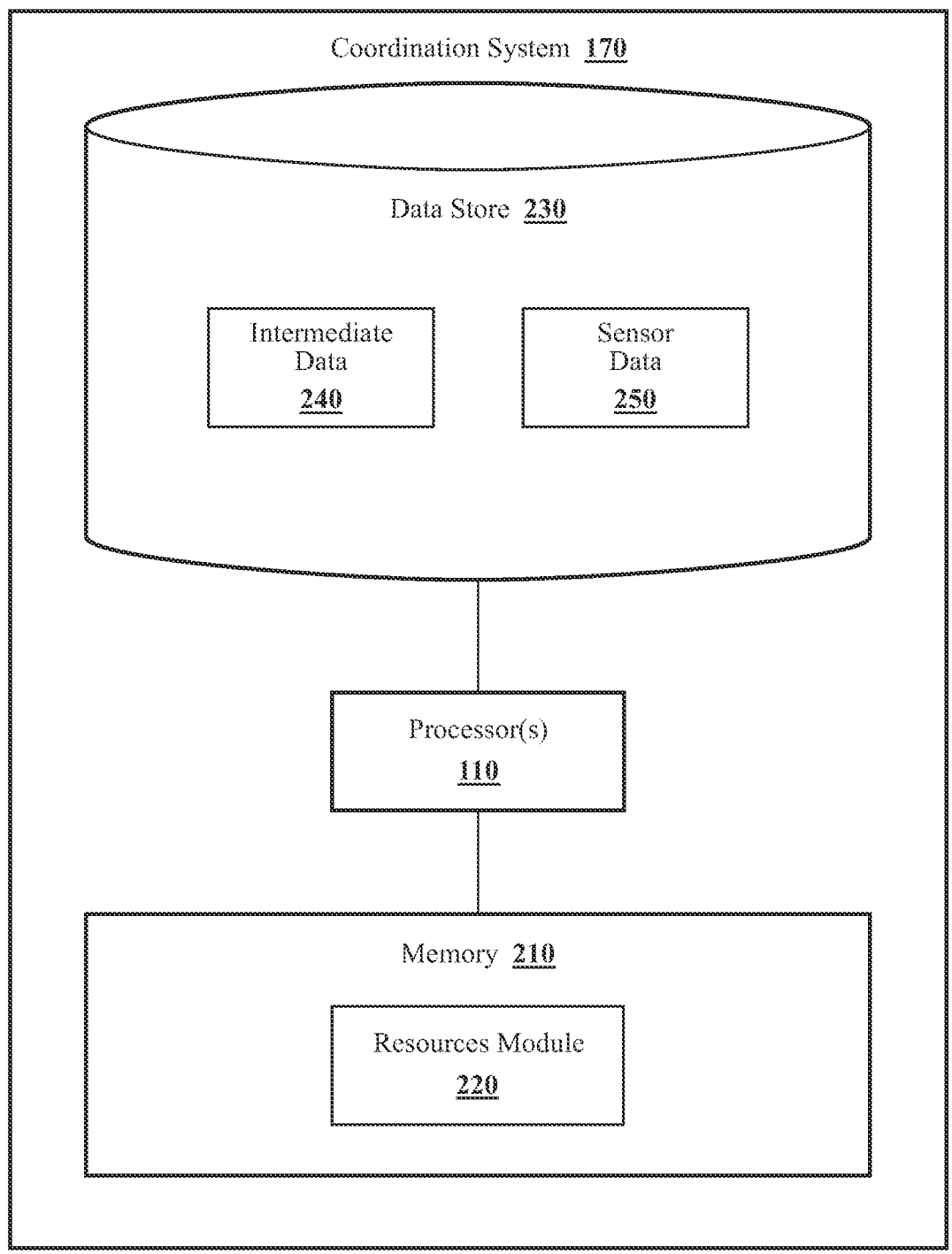
FIG. 2 illustrates one embodiment of a coordination system that is associated with coordinating and optimizing prediction models using intermediate data and vehicle-to-vehicle (V2V) communications.

With reference to FIG. 2, one embodiment of the coordination system 170 of FIG. 1 is further illustrated. The coordination system 170 is shown as including a processor(s) 110 from the vehicle 100 of FIG. 1. Accordingly, the processor(s) 110 may be a part of the coordination system 170, the coordination system 170 may include a separate processor from the processor(s) 110 of the vehicle 100, or the coordination system 170 may access the processor(s) 110 through a data bus or another communication path. In one embodiment, the coordination system 170 includes a memory 210 that stores a resources module 220. The memory 210 is a random-access memory (RAM), a read-only memory (ROM), a hard-disk drive, a flash memory, or other suitable memory for storing the resources module 220. The resources module 220 is, for example, computer-readable instructions that when executed by the processor(s) 110 cause the processor(s) 110 to perform the various functions disclosed herein.

The coordination system 170 as illustrated in FIG. 2 is generally an abstracted form of the coordination system 170 as may be implemented between the vehicle 100 and a cloud-computing environment. Furthermore, the resources module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the resources module 220, in one embodiment, acquires sensor data 250 that includes at least camera images. In further arrangements, the resources module 220 acquires the sensor data 250 from further sensors such as radar sensors 123, LIDAR sensors 124, and other sensors as may be suitable for observing vehicles and locations of the vehicles.

Accordingly, the coordination system 170 or the resources module 220, in one embodiment, controls the respective sensors to provide the data inputs in the form of the sensor data 250. Additionally, while the resources module 220 is discussed as controlling the various sensors to provide the sensor data 250, in one or more embodiments, the resources module 220 can employ other techniques to acquire the sensor data 250 that are either active or passive. For example, the resources module 220 may passively sniff the sensor data 250 from a stream of electronic information provided by the various sensors to further components within the vehicle 100. Thus, the sensor data 250, in one embodiment, represents a combination of perceptions acquired from multiple sensors.

Moreover, in one embodiment, the coordination system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the resources module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 230 further includes the intermediate data 240 from layers of a prediction model that detects objects, plans trajectories, and so on. As further explained below, the coordination system 170 extracts the intermediate data 240 from intermediate activations. In a network model that computes estimates, activations determine whether an intermediate neuron (e.g., node) processes input data for prediction by making comparisons to other simpler or relevant operations. As such, the intermediate data 240 may be processed data after a layer within a model or network that computes estimates or inferences. Here, the intermediate data 240 can represent image data, CAN data, past trajectories, velocity, angular velocity, and so on of the vehicle 100 partially processed using the prediction model. In one approach, the intermediate data 240 are encoded features associated with maps or other representations (e.g., tensors). The coordination system 170 can communicate using V2V the intermediate data 240 due to reduced size, thereby saving bandwidth while assisting other vehicles with prediction.

In various implementations, the resources module 220 performs additional tasks beyond controlling the respective sensors to acquire and provide the sensor data 250. For example, the resources module 220 includes instructions that cause the processor 110 to process acquired data, such as from the sensor system 120, for models that predict or plan vehicle tasks. Here, the models may execute or involve performing the vehicle tasks common to vehicles in an area. For example, two or more vehicles use similar object detection and tracking models for navigating a driving scenario. The coordination system 170 in a vehicle communicates the intermediate data 240 from the model(s) that assists processing for additional tasks (e.g., prediction, planning, etc.). As further explained below, a cooperation model can prioritize the intermediate data 240 according to relevance, a timeframe, and so on through statistical analysis about the target vehicle while factoring available bandwidth. In this way, the coordination system 170 improves computational efficiency in an area and optimizes V2V resources through sharing the intermediate data 240 that reduces additional processing functions.

Figure 3:
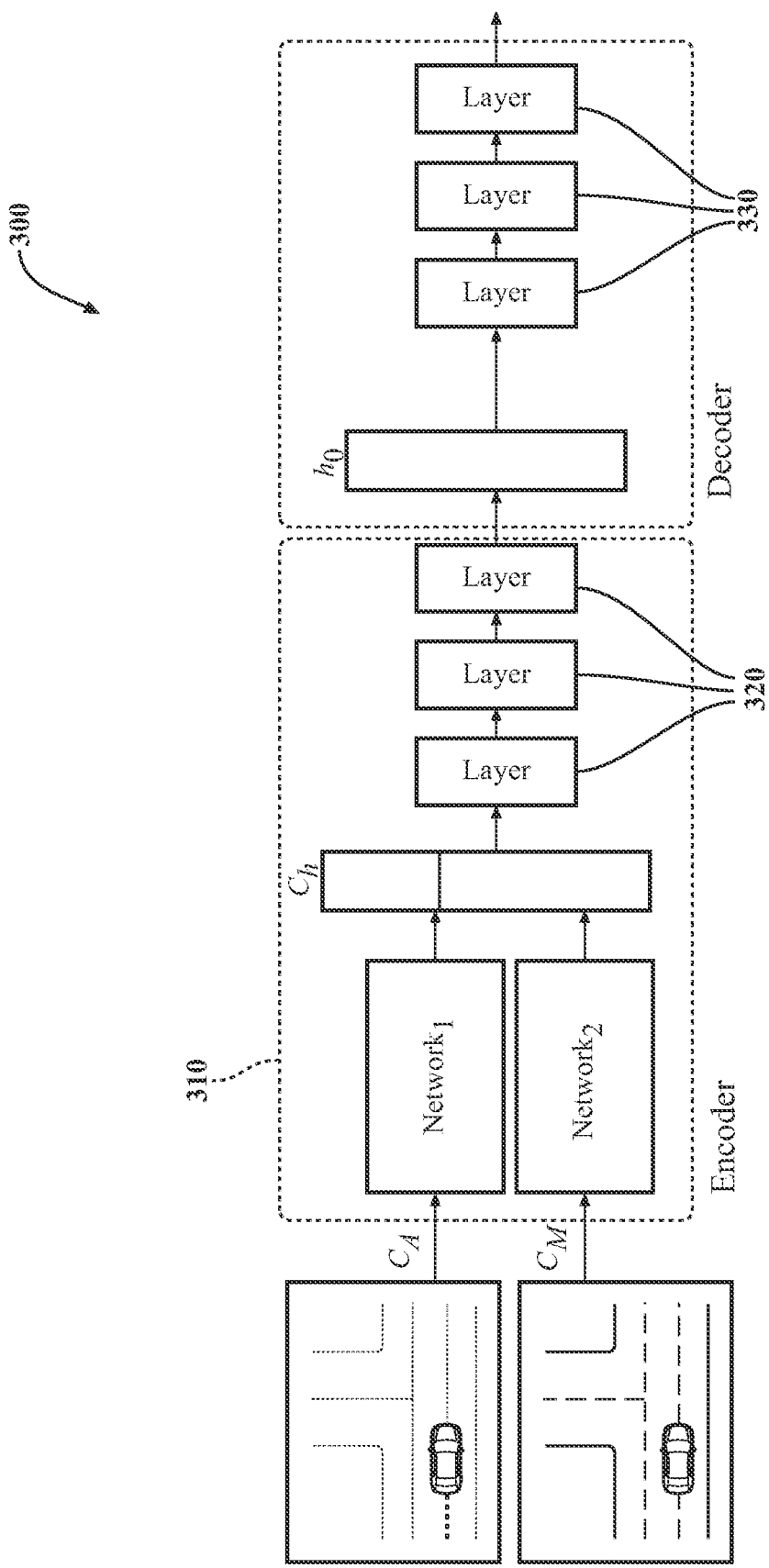
FIG. 3 illustrates an example of a prediction model having intermediate data processed by layers for use by the coordination system.

Turning now to FIG. 3, an example of a prediction model 300 having intermediate data 240 processed by layers used by the coordination system 170 is illustrated. Besides the prediction model 300, the coordination system 170 can extract the intermediate data 240 about a target vehicle and communicate the intermediate data 240 to assist nearby vehicles, thereby improving estimations while also reducing V2V usage or bottlenecks. Here, estimates are improved by reducing additional computations within a model. As previously explained, the intermediate data 240 may be processed data after a layer within a model or network encodes an input. In comparison, the prediction model 300 can generate complete data such as by estimating probabilities for position, trajectories, and so on involving a target vehicle. Accordingly, the coordination system 170 selects the intermediate data 240 from layers that are useful for cooperative prediction while using less bandwidth than complete data. Computational resources are also saved for receiving vehicles using the intermediate data 240 to avoid functions involving prediction through utilizing optimized perception data.

In the prediction model 300, an encoder 310 processes an observed path of a target vehicle $c_A$ and observed map data $c_M$ using Network$_1$ and Network$_2$, respectively. The encoder 310 outputs a combined encoding state $c_h$ that represents observed path and map data perceived for the target vehicle. Here, the layers 320 internally process the encoding state $c_h$, such as through convolution, pooling, and so on computations for identifying salient attributes. Outputs of the layers 320 are intermediate activations having image data, feature maps, CAN data, past trajectories, velocity, angular velocity, and so on of the vehicle 100 that are partially processed. Furthermore, the encoder 310 embeds c into a hidden state $h_0$ and the decoder 330 sample states conditioned on $h_0$ for completing predictions. For example, the predictions estimate a trajectory set having a small variance to a mean trajectory. The vehicle 100 selects and follows a trajectory from the set. Furthermore, the intermediate data such as hidden state $h_0$ is shared by the coordination system 170 to improve decoding tasks by nearby vehicles.

Moreover, the coordination system 170 extracts the intermediate data 240 using the cooperation model while balancing communication trade-offs for a V2V message. For example, the coordination system 170 in the vehicle 100 assigns costs to the V2V message that factors processing savings by other vehicles utilizing the intermediate data 240 to track the target vehicle. The costs can incorporate the benefits for sharing data types such as image data, position, CAN data, past trajectories, velocity, and so on. In one approach, the coordination system 170 computes that for the timeframe and bandwidth resources, the intermediate data 240 for the position of a target vehicle is more valuable than image data. Here, a timeframe may be expiration times (e.g., 2 seconds) for an observation relative to a vehicle pair.

Furthermore, another coordination factor is the compressibility of the intermediate data 240 by the coordination system 170. Here, compressibility impacts possible reductions in bandwidth utilization. In other words, the coordination system 170 utilizes the intermediate activations or hidden state $h_0$ from the prediction model 300 to generate useful samples for efficient transmission and task execution (e.g., feature decoding, prediction, planning, etc.) by nearby vehicles. In this way, the intermediate activations of the prediction model 300 in the vehicle 100 may become an auxiliary input to other estimation models utilized by nearby vehicles. The prediction models in nearby vehicles improve estimates of target vehicles by combining acquired data with the received auxiliary data. In addition, the prediction models also use the intermediate data 240 to avoid computation functions from effectively pre-processing conducted by the vehicle 100. As further explained below, the coordination system 170 also optimizes joint prediction and bandwidth utilization while allowing models to request relevant information.

Figure 4:
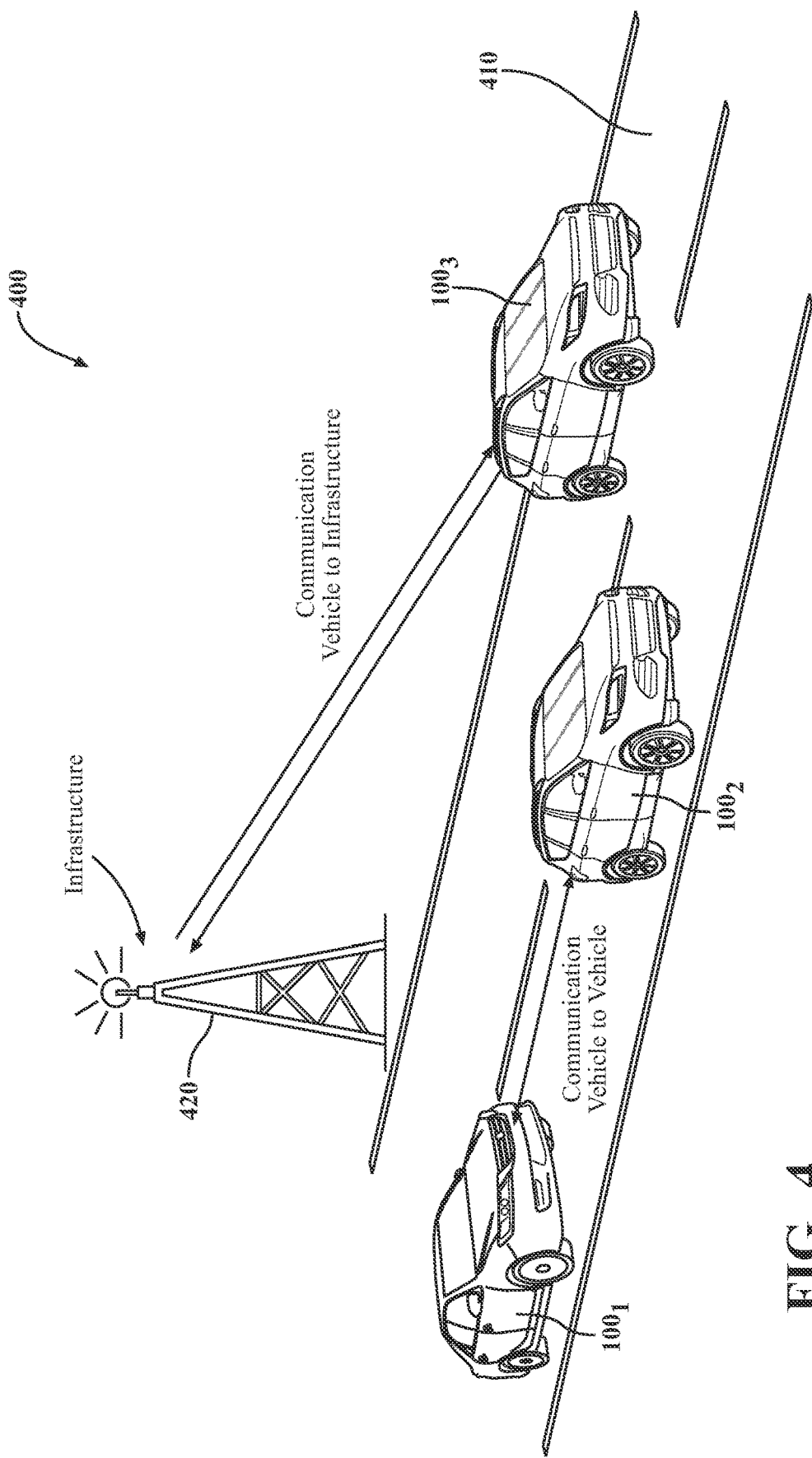
FIG. 4 illustrates an example of the coordination system optimizing V2V communications and predictions in a driving scenario using the intermediate data.

Regarding FIG. 4, an example of the coordination system 170 optimizing V2V communications and predictions in a driving scenario 400 using the intermediate data 240 is illustrated. In particular, vehicles in the driving scenario 400 save on computational resources by sharing the intermediate data 240 that is relevant to avoid functions involving prediction. In this way, the coordination system 170 allows vehicles to access optimized perception data. Here, the vehicles $100_1$-$100_3$ are traveling on the road 410. The vehicle $100_3$ is a target vehicle that communicates to the infrastructure 420 for motion planning, edge computing, cloud services, and so on. The vehicles $100_1$ and $100_2$ leverage the intermediate data 240 associated with a prediction model(s) that improves estimates for the vehicle $100_3$. Here, both vehicles $100_1$ and $100_2$ are observing the vehicle $100_3$ for vehicle tasks such as objection detection, cooperative prediction, and so on.

In various implementations, the vehicle $100_1$ selects processed data from intermediate activations of the prediction model 300 during an observation of the vehicle $100_3$. The intermediate and partially processed data assists expected observations by the vehicle $100_2$ of the vehicle $100_3$. The coordination system 170 can select data from particular intermediate activations by factoring view information from the camera(s) 126. In other words, the vehicle $100_1$ has an enhanced view of the vehicle $100_3$ compared to the vehicle $100_2$, thereby making the intermediate data 240 from images relevant and valuable for sharing. As explained below, the vehicle $100_2$ uses the intermediate data 240 for training or computing estimates by the prediction model 300. Correspondingly, the vehicle $100_2$ may perform these computations in real-time or online, thereby improving system adaptability and performance.

In one approach, the vehicle $100_1$ communicates a subset of cluster weights from the prediction model 300 for intermediate activations that particularly assist predictions by the vehicle $100_2$ with reduced bandwidth. For example, the cluster weights are associated with partial trajectories of the vehicle $100_3$ that the vehicle $100_2$ uses within the prediction model 300 for additional estimates. The vehicle $100_2$ can apply the cluster weights in the prediction model 300 for estimating further trajectories of the vehicle $100_3$ without training. In this way, the vehicle $100_2$ saves on computational resources using the already processed data from the vehicle $100_1$ having improved perception attributes about the vehicle $100_3$. Furthermore, the vehicle $100_1$ can communicate internal representations of the vehicle $100_3$ using a Gaussian model. Here, the Gaussian model includes mean values computed by the prediction model 300 of trajectories estimated for the vehicle $100_3$.

In various implementations, the selection of the intermediate data 240 from the prediction model 300 involves quantifying relevancy. The quantification improves cooperative prediction by communicating the intermediate data 240 for the vehicle $100_2$ to more accurately compute estimates involving the vehicle $100_3$. For example, the coordination system 170 computes a statistical distribution having a mean and a variance of polynomial trajectories for the vehicle $100_3$. In one approach, the statistical distribution is computed using trajectory estimates of the vehicle $100_3$ communicated by the vehicle $100_2$. As such, the vehicle $100_1$ uses this as a feedback loop to adapt the relevancy of the intermediate data 240 from the prediction model 300 for selecting subset data from the intermediate activations.

Moreover, the coordination system 170 may use a greedy model to prioritize processed data from the intermediate activations. Here, the coordination system 170 selects the processed data that is useful for observing the vehicle $100_3$ by the vehicle $100_2$. In one approach, the utility of the intermediate data 240 is identified through the quantification described previously. The coordination system 170 forms a packet with the processed data and then repeats the process. In another approach, the intermediate data 240 is organized by type (e.g., image, position, trajectories, etc.) and expiration times (e.g., 2 seconds) for each packet within a frame by the greedy model. The processed data next relevant is identified given the processed data already packetized and so on. In this way, the coordination system 170 can form a frame of processed data relevant to the vehicle $100_2$ that prevents bandwidth overload while improving prediction.

For example, the processed data may be a vector where the size is fitted to a budget constraint.

Moreover, the vehicle $100_2$ uses received intermediate data 240 associated with observations for the vehicle $100_3$ and trains a prediction model accordingly. In one approach, the vehicle $100_2$ trains the prediction model 300 online, thereby adapting in real-time to improve estimates. The intermediate data 240 can also be immediately processed by the vehicle $100_2$ for joint prediction with the vehicle $100_1$. In this way, the estimates computed by the vehicle $100_2$ improve through $100_1$ sharing quality data for the vehicle $100_3$ without straining V2V resources.

Figure 5:
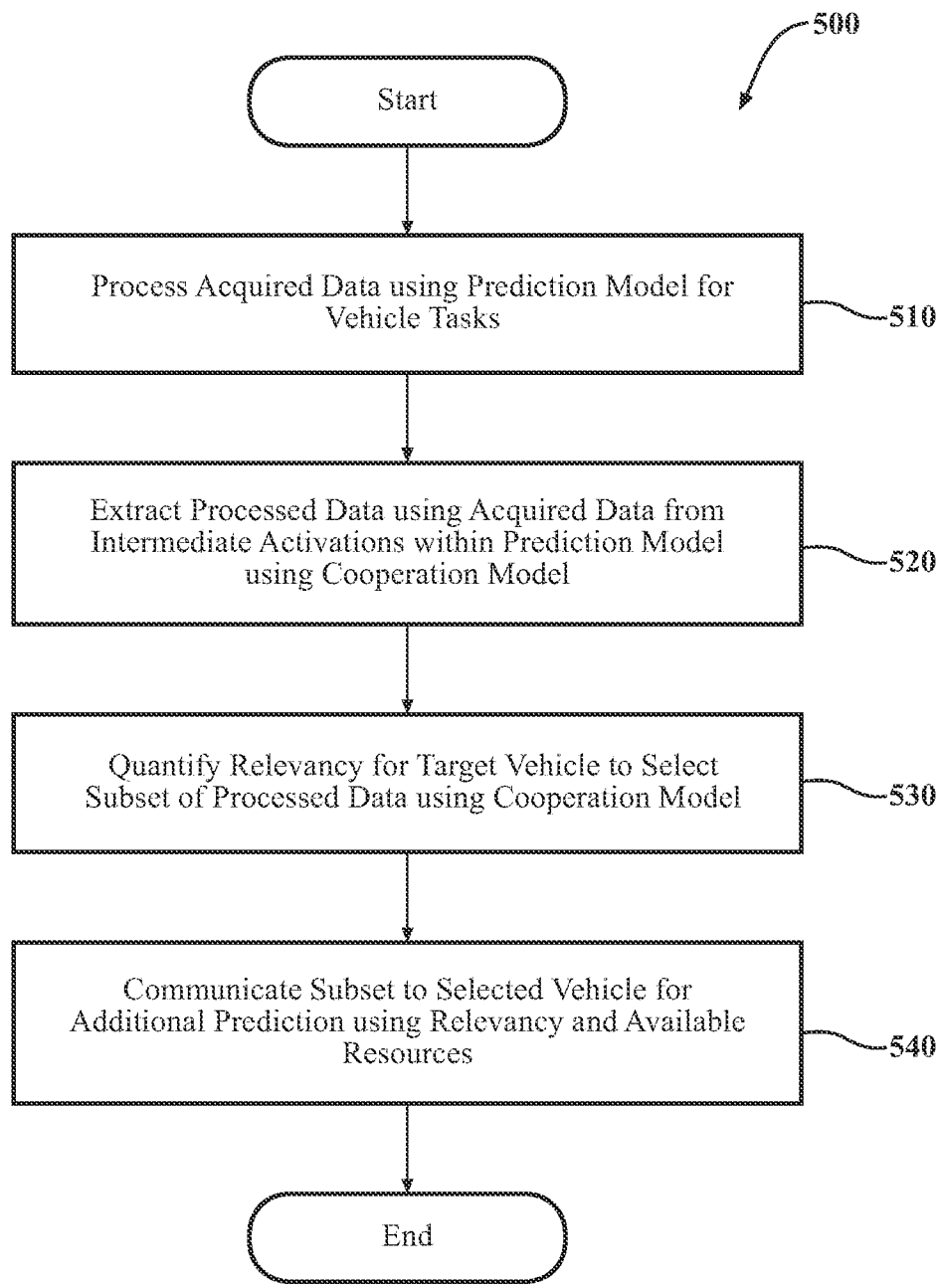
FIG. 5 illustrates one embodiment of a method having a coordination system extracting and quantifying the relevance of the intermediate data for optimizing communications.

Now turning to FIG. 5, a flowchart of a method 500 describing the coordination system 170 extracting and quantifying the relevance of the intermediate data 240 for optimizing communications is illustrated. Method 500 will be discussed from the perspective of the coordination system 170 of FIGS. 1 and 2. While the method 500 is discussed in combination with the coordination system 170, it should be appreciated that the method 500 is not limited to being implemented within the coordination system 170 but is instead one example of a system that may implement the method 500. In various implementations, vehicles in an area utilizing the method 500 save on computational and bandwidth resources by sharing intermediate data 240 that is relevant. The sharing avoids functions involving prediction for vehicles that receive the intermediate data 240. In this way, the coordination system 170 allows vehicles to access perception data that is optimized for a driving scenario.

At 510, the coordination system 170 processes acquired data using a prediction model for vehicle tasks. Here, the data is the sensor data 250 from cameras, radar sensors 123, LIDAR sensors 124, and other sensors for observing vehicles. Other examples of data include position, CAN data, past trajectories, velocity, and so on from observations by the vehicle 100 of a driving scenario. In one approach, the acquired data are estimates (e.g., trajectories) by nearby vehicles communicating over V2V that form a feedback loop for improving predictions. Furthermore, vehicle tasks can include cooperative prediction, object detection, motion planning, and so on by nearby vehicles.

In various implementations, the coordination system 170 utilizes the prediction model 300 or another model to extract the intermediate data 240 useful to nearby vehicles. As such, the coordination system 170 improves estimates by other vehicles while reducing V2V utilization since the intermediate data 240 is compact. In one approach, the intermediate data 240 is tailored for a driving scenario (e.g., intersection) by communicating certain data types and attributes (e.g., position, speed, etc.).

At 520, the coordination system 170 extracts processed data using acquired data from intermediate activations within the prediction model 300 according to a cooperation model. As previously explained, activations determine whether an intermediate neuron (e.g., node) processes input data for prediction by making comparisons to other simpler or relevant operations. As such, the intermediate data 240 may be processed data from an output of a layer within a model or network. Here, the intermediate data 240 can represent features of image data, CAN data, past trajectories, velocity, angular velocity, and so on of the vehicle 100 partially processed by the prediction model 300. As explained above, the intermediate data 240 may also include hidden state $h_0$ associated with salient features associated with target vehicles. In comparison, the prediction model 300 generates complete data by estimating probabilities for position, trajectories, and so on involving the target vehicle.

Moreover, the cooperation model balances communication trade-offs for sharing the intermediate data 240 using V2V. For example, the coordination system 170 in the vehicle 100 assigns sharing costs that factors processing savings for other models forming predictions about a target vehicle with the intermediate data 240. Here, the costs form benefits for sharing specific data types such as image data, position, CAN data, past trajectories, velocity, and so on. For example, the coordination system 170 computes that for the timeframe and bandwidth resources, the intermediate data 240 about the position of a target vehicle is more valuable than image data. Furthermore, the compressibility of the intermediate data 240 is factored. As such, the coordination system 170 can reduce bandwidth utilization by selecting the intermediate data 240 that is both useful for nearby vehicles and readily compressible.

At 530, the resources module 220 quantifies relevancy for a target vehicle to select a subset of the processed data using the cooperation model. Here, the cooperation model further optimizes bandwidth by selecting content of V2V messages that are useful, compact, and robust for sharing. For example, the resources module 220 can communicate internal representations of a target vehicle using a Gaussian model. Mean values are derived using the Gaussian model for trajectories estimated about the target vehicle using the prediction model 300.

Moreover, the resources module 220 quantifies relevancy to select the intermediate data 240 for V2V communication. The quantification improves cooperative prediction by communicating intermediate data 240 that increases prediction accuracy for observations involving the target vehicle. As previously explained, the coordination system 170 computes a statistical distribution having a mean and a variance of polynomial trajectories for the target vehicle. In another example, the coordination system 170 uses the greedy model explained above to prioritize processed data from the intermediate activations. In one approach, the greedy model forms a vector where relevant data is organized by type (e.g., image, position, trajectories, etc.) and expiration times (e.g., 2 seconds). In this way, the coordination system 170 saves bandwidth while improving prediction by identifying the intermediate data 240 that is relevant and tailored.

At 540, the coordination system 170 communicates a subset of the intermediate data 240 to a selected vehicle. In particular, the selected vehicle may execute additional predictions using relevancy and available resources. For example, the vehicle 100 communicates cluster weights from the prediction model 300 for particular and relevant intermediate activations that assist predictions by the selected vehicle to reduce bandwidth. Here, the cluster weights are associated with partial trajectories of the target vehicle that the selected vehicle uses for computing additional estimates. The selected vehicle can apply the cluster weights in the prediction model 300 for estimating further trajectories of target vehicles without training.

Moreover, the selected vehicle uses the intermediate data 240 to train the prediction model 300. In one approach, the selected vehicle trains the prediction model 300 online, thereby adapting in real-time to improve estimates. The intermediate data 240 can also be immediately processed by the selected vehicle for joint prediction with the vehicle 100. In this way, the estimates computed by the selected vehicle improve the sharing of quality data between vehicles about the target vehicle without straining V2V resources and reducing computation loads.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the coordination system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the coordination system 170, and/or the automated driving module(s) 160 may control some or all of the vehicle systems 140 and, thus, may be partially or fully autonomous as defined by the society of automotive engineers (SAE) levels 0 to 5.

The processor(s) 110, the coordination system 170, and/or the automated driving module(s) 160 can be operatively connected to communicate with the various vehicle systems 140 and/or individual components thereof. For example, returning to FIG. 1, the processor(s) 110, the coordination system 170, and/or the automated driving module(s) 160 can be in communication to send and/or receive information from the various vehicle systems 140 to control the movement of the vehicle 100. The processor(s) 110, the coordination system 170, and/or the automated driving module(s) 160 may control some or all of the vehicle systems 140.

The processor(s) 110, the coordination system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the coordination system 170, and/or the automated driving module(s) 160 can control the direction and/or speed of the vehicle 100. The processor(s) 110, the coordination system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the coordination system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A coordination system, comprising:
a processor; and
a memory storing instructions that, when executed by the processor, cause the processor to:
process acquired data, by a subject vehicle using a prediction model, to execute a vehicle task associated with navigation of a driving scene;
extract processed data according to the acquired data from intermediate activations of layers within the prediction model according to a cooperation model;
quantify relevancy of the processed data, for a target vehicle, to select a subset associated with the intermediate activations using the cooperation model, and the relevancy adapts with trajectory estimates of the target vehicle received from a selected vehicle; and
communicate the subset to the selected vehicle having the prediction model for an additional prediction according to the relevancy and available resources to transmit the subset.

2. The coordination system of claim 1, further including instructions to select the processed data according to expected observations by the selected vehicle of the target vehicle using the prediction model, wherein the subject vehicle observes the target vehicle from a view different than the selected vehicle.

3. The coordination system of claim 1, wherein the instructions to communicate the subset further include instructions to communicate cluster weights from the prediction model and internal representations of the target vehicle using a Gaussian model, wherein the Gaussian model includes mean values computed for the trajectory estimates of the target vehicle.

4. The coordination system of claim 1, wherein the instructions to quantify the relevancy further include instructions to compute a statistical distribution having a mean and a variance of polynomial trajectories associated with the target vehicle.

5. The coordination system of claim 1, further including instructions to:
prioritize the processed data from the intermediate activations using a greedy model that recomputes the relevancy after forming a data packet having a portion of the processed data in a frame; and
optimize bandwidth between the subject vehicle and the selected vehicle for the available resources using the frame.

6. The coordination system of claim 1, further including instructions to:
receive the trajectory estimates of the target vehicle from the selected vehicle by the subject vehicle using vehicle-to-vehicle (V2V) communications.

7. The coordination system of claim 1, further including instructions to train the prediction model by the selected vehicle using the subset.

8. The coordination system of claim 1, wherein the selected vehicle processes the subset within the prediction model without training.

9. The coordination system of claim 1, wherein the intermediate activations represent one of image data, controller area network (CAN) data, past trajectories, velocity, and angular velocity of the subject vehicle partially processed by the prediction model.

10. A non-transitory computer-readable medium comprising:
instructions that when executed by a processor cause the processor to:
process acquired data, by a subject vehicle using a prediction model, to execute a vehicle task associated with navigating a driving scene;
extract processed data according to the acquired data from intermediate activations of layers within the prediction model according to a cooperation model;
quantify relevancy of the processed data, for a target vehicle, to select a subset associated with the intermediate activations using the cooperation model, and the relevancy adapts with trajectory estimates of the target vehicle received from a selected vehicle; and
communicate the subset to the selected vehicle having the prediction model for an additional prediction according to the relevancy and available resources to transmit the subset.

11. The non-transitory computer-readable medium of claim 10, further including instructions to select the processed data according to expected observations by the selected vehicle of the target vehicle using the prediction model, wherein the subject vehicle observes the target vehicle from a view different than the selected vehicle.

12. A method comprising:
processing acquired data, by a subject vehicle using a prediction model, to execute a vehicle task associated with navigating a driving scene;
extracting processed data according to the acquired data from intermediate activations of layers within the prediction model according to a cooperation model;
quantifying relevancy of the processed data, for a target vehicle, to select a subset associated with the intermediate activations using the cooperation model, and the relevancy adapts with trajectory estimates of the target vehicle received from a selected vehicle; and
communicating the subset to the selected vehicle having the prediction model for an additional prediction according to the relevancy and available resources to transmit the subset.

13. The method of claim 12, further comprising selecting the processed data according to expected observations by the selected vehicle of the target vehicle using the prediction model, wherein the subject vehicle observes the target vehicle from a view different than the selected vehicle.

14. The method of claim 12, wherein communicating the subset further includes communicating cluster weights from the prediction model and internal representations of the target vehicle using a Gaussian model, wherein the Gaussian model includes mean values computed for the trajectory estimates of the target vehicle.

15. The method of claim 12, wherein quantifying the relevancy further includes computing a statistical distribution having a mean and a variance of polynomial trajectories associated with the target vehicle.

16. The method of claim 12, further comprising:
prioritizing the processed data from the intermediate activations using a greedy model that recomputes the relevancy after forming a data packet having a portion of the processed data in a frame; and
optimizing bandwidth between the subject vehicle and the selected vehicle for the available resources using the frame.

17. The method of claim 12, further comprising:
receiving the trajectory estimates of the target vehicle from the selected vehicle by the subject vehicle using vehicle-to-vehicle (V2V) communications.

18. The method of claim 12, further comprising training the prediction model by the selected vehicle using the subset.

19. The method of claim 12, wherein the selected vehicle processes the subset within the prediction model without training.

20. The method of claim 12, wherein the intermediate activations represent one of image data, controller area network (CAN) data, past trajectories, velocity, and angular velocity of the subject vehicle partially processed by the prediction model.

* * * * *